(No Model.)
G. P. PRICE.
GATE.
No. 379,660. Patented Mar. 20, 1888.
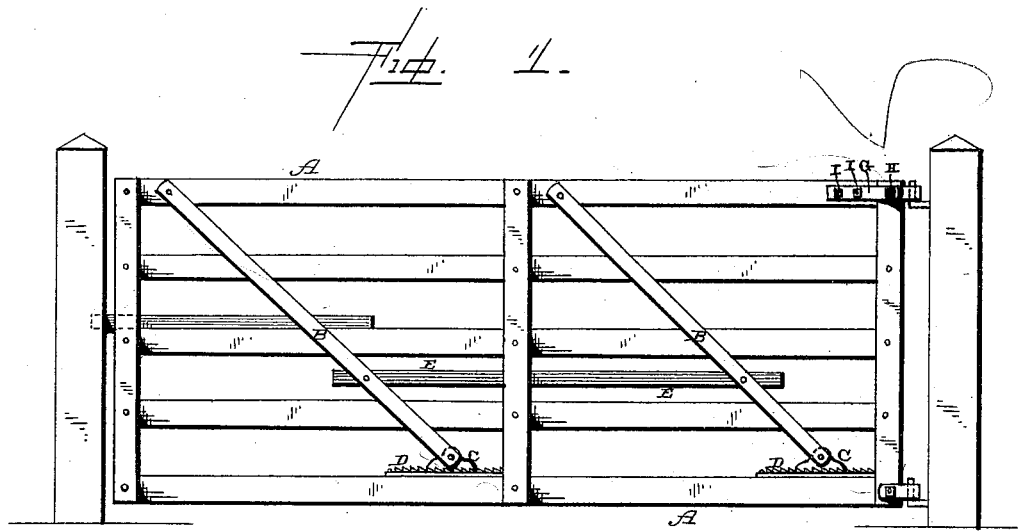
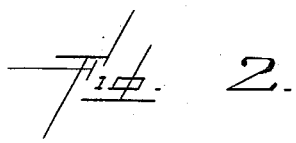
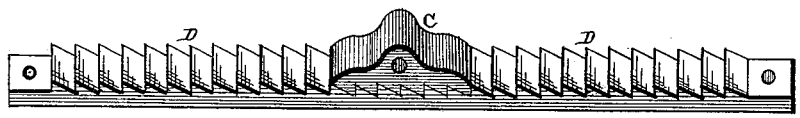
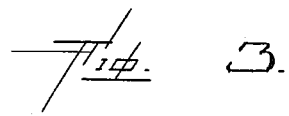
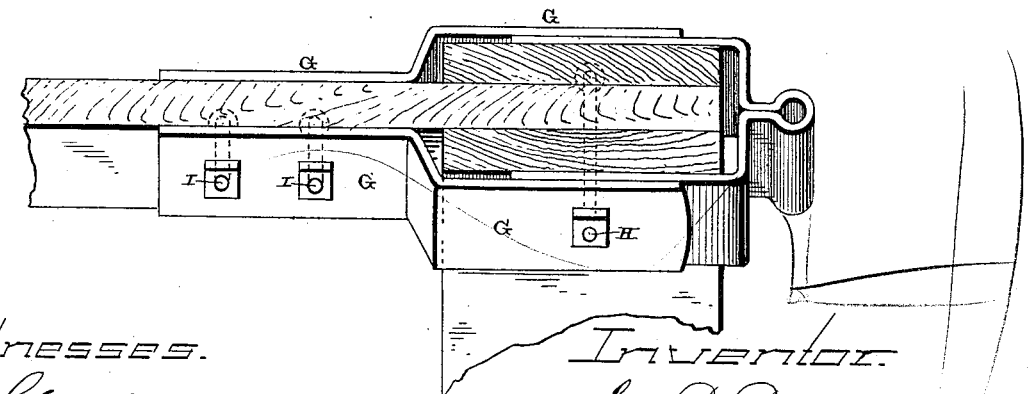
Witnesses.
R. F. Gardner
Edm. P. Ellis
Inventor.
Geo. P. Price,
per F. A. Lehmann,
atty.

UNITED STATES PATENT OFFICE.

GEORGE P. PRICE, OF CARLISLE, OHIO.

GATE.

SPECIFICATION forming part of Letters Patent No. 379,660, dated March 20, 1888.

Application filed July 11, 1887. Serial No. 244,010. (No model.)

*To all whom it may concern:*

Be it known that I, GEORGE P. PRICE, of Carlisle, in the county of Warren and State of Ohio, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates; and it consists in the combination of the gate and pivoted supporting-strips which extend diagonally down the sides of the gate, ratchet-dogs pivoted to their lower ends, ratchets which are secured to the gate, the upper hinge, and the hinged plates secured in position by means of the hinge-bolt at their outer ends, as will be more fully described hereinafter.

One object of my invention is to provide an attachment for the hinge of the gate, so as to give it additional strength without destroying the flexibility of the joint at this point.

Figure 1 is a side elevation of a gate embodying my invention. Fig. 2 is a detail view of the adjusting devices attached to the supporting-strips. Fig. 3 is a detached view of the hinge and the plates connected thereto.

A represents a gate of ordinary construction, which is adapted to be adjusted at its free end in the usual manner. Fastened to the upper rail of the gate are the supporting-strips B, which extend diagonally downward, and which have connected to their lower ends the ratchet-dogs C. These dogs engage with the ratchet-bars D, which are secured to the upper edge of the lower rail of the gate. In case supporting-strips B are to be used upon each side of the gate they will be connected together in pairs by a rod, E, so that they will always be moved alike, and they will have their lower ends connected to opposite sides of the dogs C by a single bolt, which will pass through all of the parts. Whenever the gate sags it will only be necessary to move the lower ends of the supporting-strips B, carrying the dogs C, forward toward the free end of the gate, and this will cause the outer end of the gate to be raised upward and held in that position, so as to freely pass over snowdrifts, or to allow small animals to pass from one field to another.

In order to strengthen the gate at its upper hinge, the strengthening-plates G are applied to the gate, as shown, and fastened thereto by the bolt H, which passes through the hinge, and by the bolts I, which are passed through the outer ends of the plates and through the top rail of the gate. These plates or strips G are so bent as to conform to the battens of the gate, as shown in Fig. 3, and so as not to come in contact with them when the gate is elevated. If it is desired not to bend these plates G, they may be made perfectly straight, and then a piece of wood of the same thickness as the battens may be placed inside of them against the upper rail of the gate. These plates G are not necessary for the lower hinge, as the draft is all in the opposite direction. These plates give the attachment of the hinge to the gate additional strength without destroying the flexibility of the joint at this point.

Having thus described my invention, I claim—

The combination of the gate, the pivoted supporting-strips B, having the dogs C secured to their lower ends, the ratchets D, the upper hinge, and plates G, secured in position by means of the hinge-bolt and the bolts which pass through their outer ends, substantially as described.

In testimony whereof I affix my signature in presence of two witnesses.

GEORGE P. PRICE.

Witnesses:
JOHN M. DACHTLER,
JOHN B. MILLER.